United States Patent [19]

Allen et al.

[11] Patent Number: 5,198,727
[45] Date of Patent: * Mar. 30, 1993

[54] ACOUSTIC RESONANCE OPERATION OF XENON-METAL HALIDE LAMPS ON UNIDIRECTIONAL CURRENT

[75] Inventors: Gary R. Allen, Chesterland; Joseph M. Allison, Euclid; John M. Davenport, Lyndhurst; Richard L. Hansler, Pepper Pike; Kenneth S. King, Willoughby, all of Ohio

[73] Assignee: General Electric Company, Schenectady, N.Y.

[*] Notice: The portion of the term of this patent subsequent to Sep. 10, 2008 has been disclaimed.

[21] Appl. No.: 665,853

[22] Filed: Mar. 7, 1991

Related U.S. Application Data

[63] Continuation-in-part of Ser. No. 482,387, Feb. 20, 1990, Pat. No. 5,047,695.

[51] Int. Cl.[5] ..................... H05B 37/00; H05B 41/00
[52] U.S. Cl. ....................... 315/291; 315/82; 315/175; 315/224; 315/DIG. 7
[58] Field of Search ................ 315/291, 82, 175, 224, 315/DIG. 7

[56] References Cited

U.S. PATENT DOCUMENTS

| | | | |
|---|---|---|---|
| 3,746,920 | 7/1973 | Flatley | 315/170 |
| 4,117,453 | 9/1978 | Hodgson et al. | 340/76 |
| 4,749,913 | 6/1988 | Stuermer et al. | 315/DIG. 7 |
| 4,904,907 | 2/1990 | Allison et al. | 315/307 |
| 5,047,695 | 9/1991 | Allen et al. | 315/291 |

Primary Examiner—Eugene R. LaRoche
Assistant Examiner—Son Dinh
Attorney, Agent, or Firm—George E. Hawranko; Stanley C. Corwin

[57] ABSTRACT

Miniature high pressure arc lamps containing a substantial pressure of xenon, in addition to metal halide and mercury, can provide instant light at turn-on and are suitable for automotive headlamps. The xenon aggravates convection which causes arc-bowing and overheating of the envelope above the arc. By operating the lamps on unidirectional current upon which a frequency-modulated high frequency ripple has been imposed, acoustic resonance is used to straighten out the arc. The use of unidirectional current permits a reduction in cost and size of the ballast control circuits operated from auto storage battery. Frequency modulation of the ripple broadens the band allowing acoustic straightening of the arc. Additional control of the arc plus reduction of cataphoresis may be achieved through a horizontal magnetic field at the arc, transverse to current flow.

15 Claims, 11 Drawing Sheets

ACOUSTIC RESONANCE OPERATION OF XENON-METAL HALIDE LAMPS ON UNIDIRECTIONAL CURRENT

This application is a continuation in part of appl'n Ser. No. 482,387, filed Feb. 20, 1990 by the same applicants, titled Direct-Current (DC) Acoustic Operation Of Xenon-Metal Halide Lamps Using High-Frequency Ripple, and similarly assigned, now U.S. Pat. No. 5,047,695, issued Sep. 10, 1991.

The invention relates to operation of high pressure miniature discharge lamps or arc tubes containing a fill of a radiation-emitting gas such as xenon, mercury, and metal halide vapor, on unidirectional current ripple-modulated at high frequencies corresponding to acoustically active frequency ranges, in order to reduce deleterious convection and cataphoretic effects and straighten the arc. It is most useful in connection with such arc tubes containing xenon and mounted horizontally in automotive headlamps.

BACKGROUND OF THE INVENTION

The anticipated advantages of arc-discharge automotive headlamps are an improved roadway illumination pattern by comparison with conventional filament headlamps; lower and shorter headlamp reflectors which permit improvements in aerodynamic efficiency and greater freedom in automotive styling, e.g. lowering the hood line; longer-lived lamps lasting the life of the vehicle; and lower consumption of energy which saves fuel and also reduces the thermal load on the plastic components of the headlamp housing.

An essential requirement of an automotive headlamp is ability to provide light immediately when needed, including instant relight after a momentary turn-off. U.S. patent application Ser. No. 157,436 filed Feb. 18, 1988 by Rolf S. Bergman et al., titled Xenon-Metal Halide Lamp Particularly Suited for Automotive Applications, abandoned in favor of continuation Ser. No. 07-539,276 filed Jun. 18, 1990, assigned to the same assignee as the present invention and incorporated herein by reference, discloses a xenon-metal halide discharge lamp which combines the high efficacy and long life of the metal halide lamp with the instant-light capability of a xenon arc tube.

But the presence of high pressures of xenon in a xenon-metal halide lamp aggravates gravity-induced convention, and this tends to limit the benefits achieved. Convection in the fill causes undesirable results: (1), upward bowing of a horizontal arc, while lamp optics prefer a straight line; (2), higher temperature of the hot spot at the envelope wall above the arc, a condition which tends to shorten lamp life; and (3), lower temperature of the cold spot at the wall under the arc, a condition which reduces the metal halide vapor pressure and results in lowered lamp efficacy.

U.S. patent application Ser. No. 320,736 filed Mar. 8, 1989 by Gary R. Allen et al. now abandoned, and its continuation in part application Ser. No. 07-579,129 filed Sep. 6, 1990, titled Acoustic Resonance Operation of Xenon Metal Halide Lamps and assigned to the same assignee as the present invention, are incorporated herein by reference. The continuation in part application, which for brevity will henceforth be referred to herein as Allen et al, teaches that gravity-induced arc bowing may be reduced or eliminated by operating the lamp on current having AC components at frequencies in preferred bands within the range extending from about 5 kHz to 1 MHz in order to excite desired acoustic modes within the lamp fill. Preferred bands are those in which acoustic perturbations compel gas or vapor movement patterns in the fill which counter gravity-induced convection. The straightening of an arc in this fashion by excitation of selected acoustic modes is termed acoustic straightening, and such manner of operation, acoustic resonance operation.

In acoustic resonance operation, frequency bands that drive the arc asymmetrically toward the wall, or cause unstable movement of the arc or of the plume or luminous aureole surrounding the arc, are to be avoided. The bands or windows in which arc-straightening occurs are relatively narrow, for instance a maximum bandwidth of 10% of a ballast output frequency of 40 kHz. The imposition of a suitable frequency modulation on the ballast frequency can greatly broaden the width of the windows for arc-straightened stable operation, for instance to 30% of the center frequency.

In Allen et al, a ballast circuit is described which is energized from the usual 12 volt DC automobile storage battery supply. It comprises an input stage in the form of a DC-to-DC boost converter which is controlled by feedback from the lamp, and a DC-to-AC inverter for the output stage. Lamp voltage and current are fed back to the input converter to regulate lamp power, and the output stage may be frequency-modulated to broaden the frequency window for stable arc-straightened operation.

The acoustically-straightened arc discharge headlamp as proposed in Allen et al, is far superior to conventional incandescent headlamps as regards lifetime, light output, packaging size, and styling freedom for automotive applications. But it has the disadvantage of higher cost, due primarily to the ballast and starter circuits required for instantaneous starting and running of the discharge headlamp.

A reduction in size and cost could be achieved by connecting the ballast circuit directly to the automobile's DC battery source and eliminating the DC/AC inverter. But, as discussed in application Ser. No. 157,360 filed Feb. 18, 1988 by Richard L. Hansler et al, titled Metal Halide Lamp Having Vacuum Shroud for Reducing Cataphoretic Effects, assigned to the same assignee as the present invention and incorporated herein by reference, now U.S. Pat. No. 4,935,668, metal halide-containing lamps operated on DC tend to cataphoresis wherein the metal ion, e.g. sodium, of the dissociated metal halide collects in the cathode end region of the lamp. The sodium contribution to light generation is thereby reduced, and the effect is most noticeable in lamps operated horizontally as in auto headlamps.

OBJECTS OF THE INVENTION

The general object of the invention is to provide an improved method and circuit apparatus for operating xenon-metal halide arc discharge headlamps, which result in lower cost and a smaller volume of components desirable for automotive applications, but which retain the benefits of acoustic arc straightening and avoid the disadvantageous effects of cataphoresis typically encountered in DC lamp operation.

A more specific object is to provide such apparatus compact enough that it can conveniently be mounted in the unused space lying immediately behind the headlamp reflector currently used on automobiles.

Another object is to improve the illumination pattern of the metal halide-containing headlamp by reducing cataphoresis and centering the sodium plume relative to the arc core within the arc tube envelope.

Other objects having to do with overcoming problems arising by virtue of solutions adopted or choices made in the present invention, will become apparent from the description which follows.

SUMMARY OF THE INVENTION

We have found that with DC operation, the cost of the ballast circuit to run the lamp can be reduced significantly relative to AC operation. The simplicity of the DC circuit also permits a smaller volume of circuit components which can conveniently be mounted on printed circuit boards in the unused space behind the parabolic headlamp reflectors in automobiles.

Acoustic straightening of the arc is achieved by modulating a unidirectional lamp current by high frequencies in preferred bands in order to excite similar acoustic arc-straightening modes as in AC operation. The cataphoresis normally encountered in DC operation is reduced. Also the preferred windows or bands in which stable arc-straightening is found may be broadened in similar fashion as in AC operation by modulating the ripple frequency. In such method of operation, lamp current is unidirectional with a frequency-modulated AC ripple superimposed.

The operating circuit comprises means for developing a start signal or pulse having a high amplitude and short duration, means for continuing the application of the start signal until initial ionization is achieved in the light source, and means for developing and applying to the light source a unidirectional run current having a ripple signal imposed thereon with modulation depth and frequency chosen to excite acoustic arc-straightening modes.

A unidirectional lamp current allows the use of a constant magnetic field to move the arc or straighten it or make it bow downward. We have found that permanent magnets cemented to the headlamp housing can effectively supplement acoustic resonance to straighten the arc, and also move it away from the upper wall of the lamp envelope to prevent overheating and possible bulging. Additionally, the magnetic field has its most pronounced effect on the sodium plume which normally is found floating above the core of the discharge. When a constant magnetic field is applied, the sodium emission becomes symmetric about the core with resultant reduction in color separation.

DETAILED DESCRIPTION OF THE INVENTION

A xenon-metal halide lamp suitable for use in the present invention is described in previously mentioned application Ser. No. 157,436 by Bergman et al. It comprises a fused silica envelope having a bulbous portion with a volume between about 0.05 and 1.0 cc. Pin-like electrodes of tungsten are sealed into opposite ends and their distal ends define an interelectrode gap of about 1.5 to 5 mm, 2 to 4 mm being preferred. The fill comprises xenon gas having a cold pressure in the range of about 2 to 15 atmospheres, mercury in a quantity providing a pressure from 2 to 20 atmospheres under operating conditions, and some metal halide salt, preferably sodium iodide with a few percent of scandium iodide, in excess of the quantity vaporized in operation, for instance 2 mg for a 0.2 cc arc tube.

As taught by Allen et al, acoustic straightening of an arc with AC requires that a favorable frequency be selected to avoid catastrophic arc instabilities at unfavorable frequencies, concentrating the applied power in frequency bands where stable operation of acoustically straightened arcs is observed. The modulation of frequency with a preferred fm prescription produces comfortably wide bands for stable arc-straightened lamp operation.

METHOD OF OPERATION ON UNIDIRECTIONAL CURRENT

The present method of operation differs from that of Allen et al in that the current waveform applied to the lamp does not change sign so that there is no inherent modulation of lamp power as in the AC case. However the unidirectional current can be intentionally modulated to any desired depth, from zero ripple to full 100% modulation. If lamp current and power are fully modulated, the acoustical effect on the lamp operation is essentially the same as if high-frequency AC operation were used, except that the frequency of the ripple in the unidirectional case must be twice the frequency of the applied current in the AC case in order to modulate the lamp power at the same frequency.

For brevity, the term DC will henceforth be used with the same meaning as unidirectional unless otherwise noted. The same arc-straightening behavior is observed over the same band of frequencies with the same frequency modulation for DC with ripple as for AC operation, bearing in mind that all ripple frequencies must be doubled to match the double power frequency corresponding to a given AC current or voltage frequency. However under DC operation with ripple, the depth of the ripple is an additional variable which does not exist under AC operation, and which has been found to be advantageous, especially during the instant-start warm-up phase of the lamp.

Figure 2:
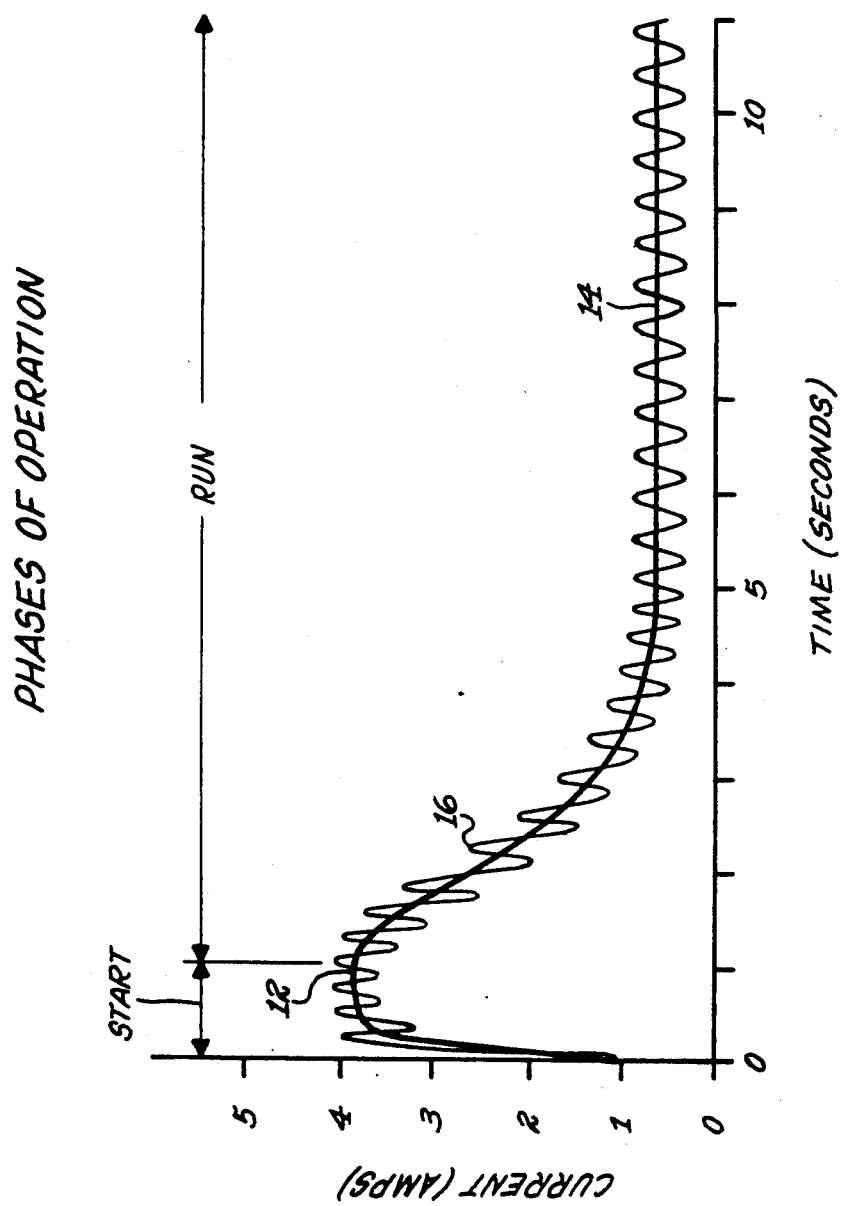
FIG. 2 is a curve showing the level of unidirectional lamp current and the ripple thereon during successive phases of operation.

In a method of operation using the invention, the lamp is started by means of ionizing pulses having an amplitude of about 10 to 20 kilovolts and a duration of about 0.1 microsecond and which are discontinued when lamp current starts. Lamp current goes through phases of operation as shown in FIG. 2, comprising a start phase and a run phase. During the start phase, the lamp is heated up and it is preferably operated with warm-up current 12 in the range of 2 to 20 times the operating or run current 16. As shown, the start phase may last from 1 to 2 seconds and the current tapers down to the run level in 3 to 5 seconds. The lamp current has a ripple signal or modulation 16 imposed thereon which is roughly constant in absolute value throughout start and run phases. However the ripple level or modulation depth (maximum minus minimum current divided by twice the mean current) increases from start or warm-up to run. It should be recognized that various different ripple levels can be imposed on the different phases.

Figure 1:
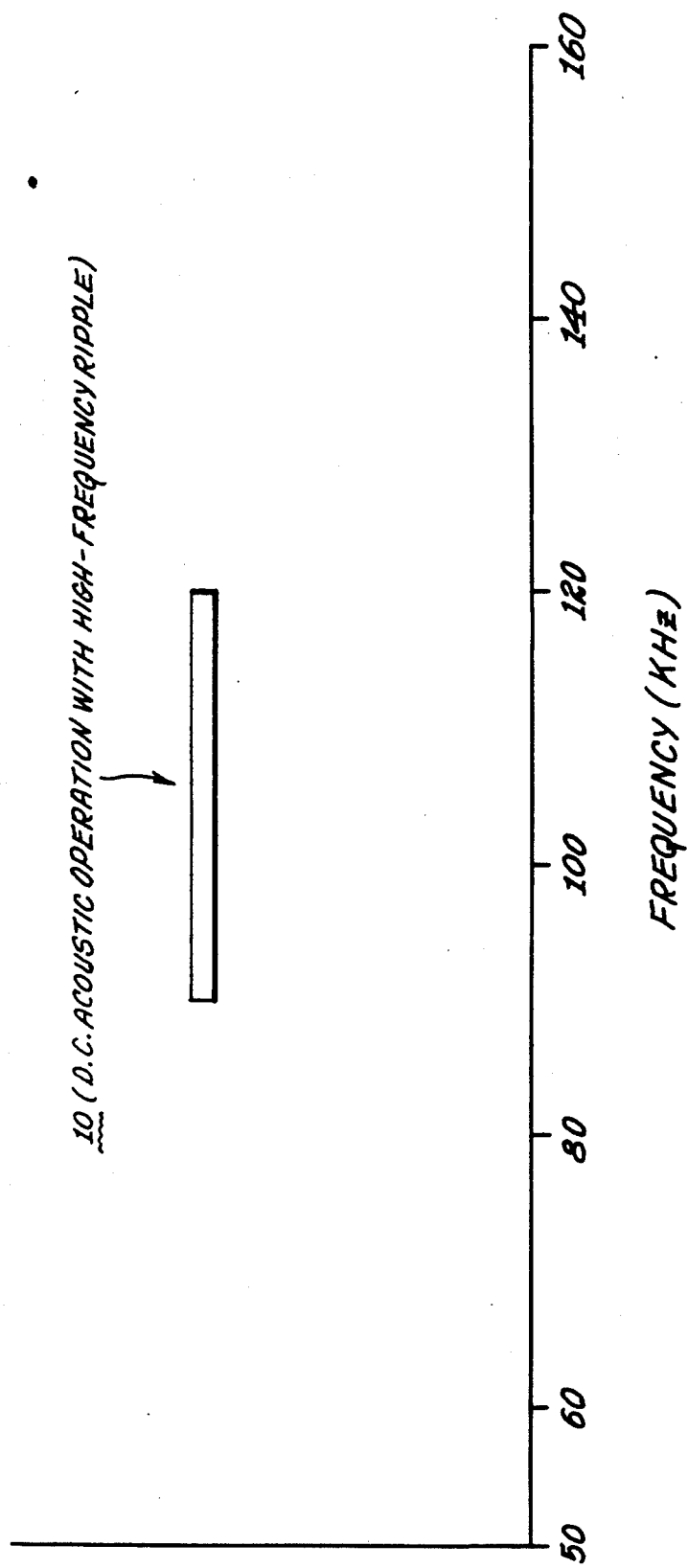
FIG. 1 is a bar chart or plot of the frequency region in which high frequency ripple is imposed on unidirectional current for arc straightening.

Referring to FIG. 1, the frequency window 10 extending from about 90 to 120 khz represents the range in which stable arc-straightening operation is achieved by imposing a frequency-modulated ripple on the run current. By way of example, the mean ripple frequency may be 105 kHz, and the frequency swing of the modulation could extend as far as 15% on both sides.

We have found that ripple levels of at least 30% are required to provide wide frequency bands for acoustically straightened operation after the lamp is warmed up. Typically, the stronger the ripple, the wider the band of stable frequencies, with 50% to 60% ripple being preferred.

In high-frequency acoustic AC operation per Allen et al, it is generally not possible to obtain stable operation during the first few seconds of operation when starting from a cold start, unless the frequency is changed as the lamp warms up. This is because the characteristic acoustic frequencies are a function of gas temperature inside the arc tube, and such temperature increases severalfold during warm-up. But under DC with ripple operation according to our present invention, the ripple level may readily be chosen lower (as a percent) at start, and increased in the run phase as shown in FIG. 2. This minimizes the destabilizing influence of acoustic power at the wrong frequency. During this warm-up period, lamp current is increased to several times normal in order to provide the desired instant light output from the xenon gas. This high current is capable of straightening the arc independently of the acoustic effect, during the few second warm-up period while the acoustic ripple is low. With this technique the amount of flicker in the headlamp beam is reduced to insignificant levels during, as well as after, warm-up.

Normally in DC operation of metal halide lamps, the effect of cataphoresis is to drive the positive ions (e.g. sodium and scandium) in the discharge to the cathode end. The result is color separation, reduced efficacy and strong axial asymmetry to the arc, the cathode side appearing like a metal-halide (white or pink) discharge, while the anode side is like a mercury (blue) discharge. However we have discovered that by using DC with ripple in combination with a short arc gap (about 2 mm), acoustic operation prevents severe color separation. Thus even though there is some asymmetry in the axial distribution of metals from halides, the efficacy and color of the metal halide lamp is largely preserved. Furthermore in headlamp applications where the beam is created by superposition of images of the arc of which half are reversed images, the weak axial asymmetries remaining in the arc are cancelled out in the beam pattern.

Weak cataphoresis related to the present invention has a potentially beneficial effect in headlamp applications where the pinkish light emitted from the cool plume above the arc differs in color from the white light of the core of the arc. When such a color-separated arc is projected onto the road as a headlight beam pattern, the colored plume appears as colored illumination in the center foreground of the roadway in front of the car. We have discovered that in DC with ripple operation where only weak cataphoresis is manifested, the colored light is less intense and appears off to the sides of the road where it is less noticeable, rather than concentrated in the center of the roadway.

BALLAST EMBODIMENTS

Figure 3:
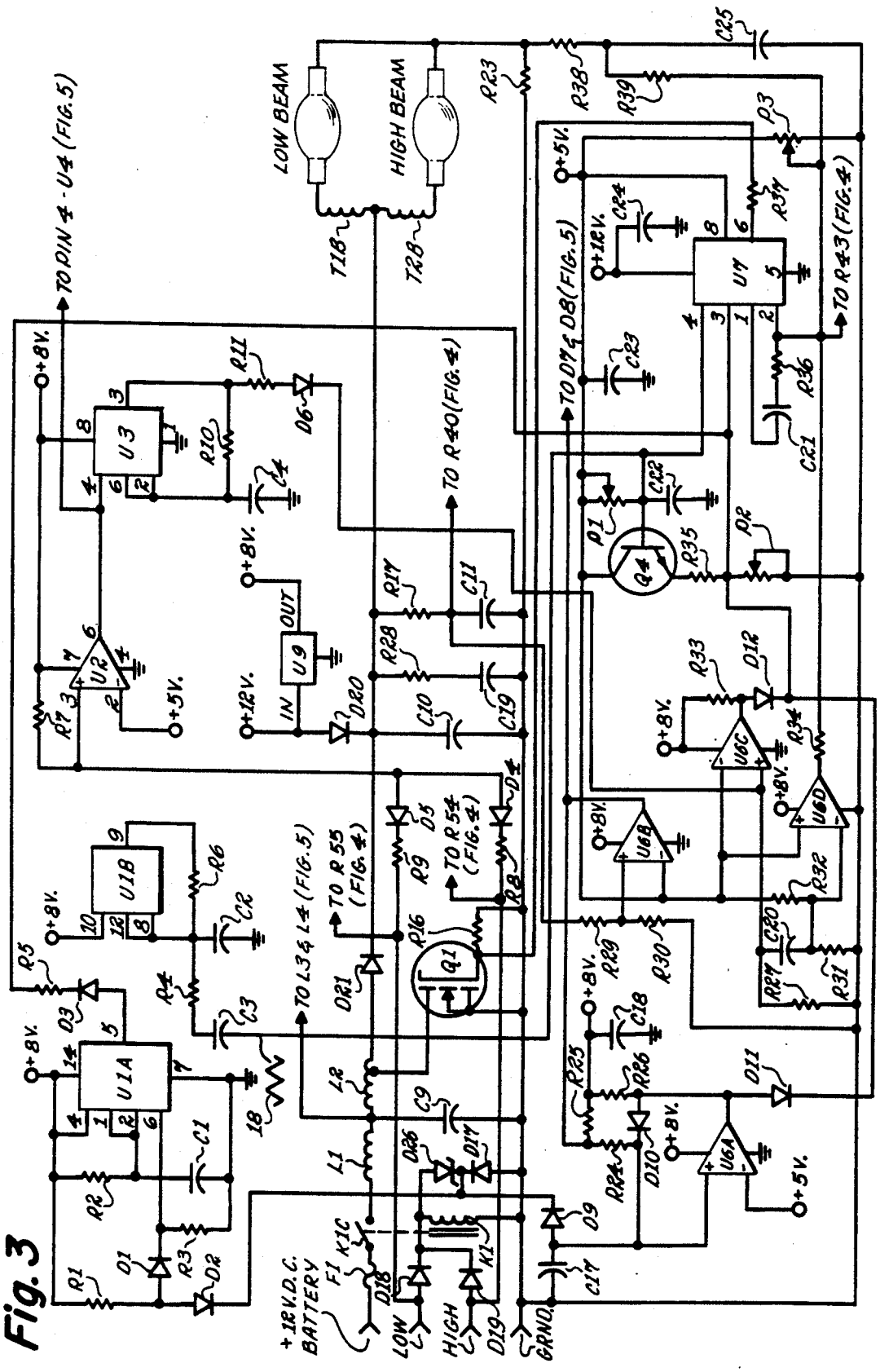
FIG. 3 is a schematic circuit diagram of the run converter of the invention.
Figure 4:
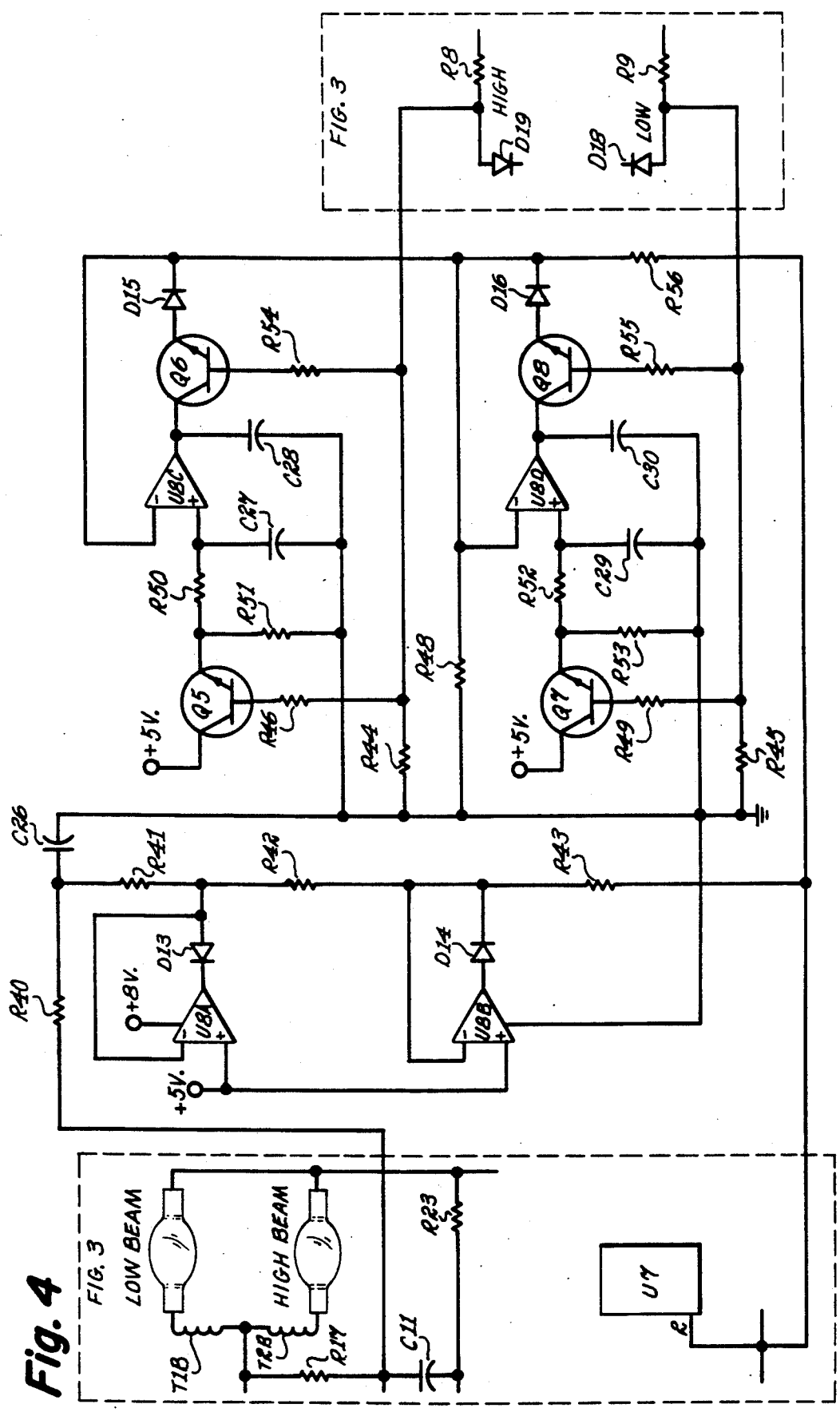
FIG. 4 is a schematic circuit diagram of the high beam and low beam warm-up timers of the invention.
Figure 5:
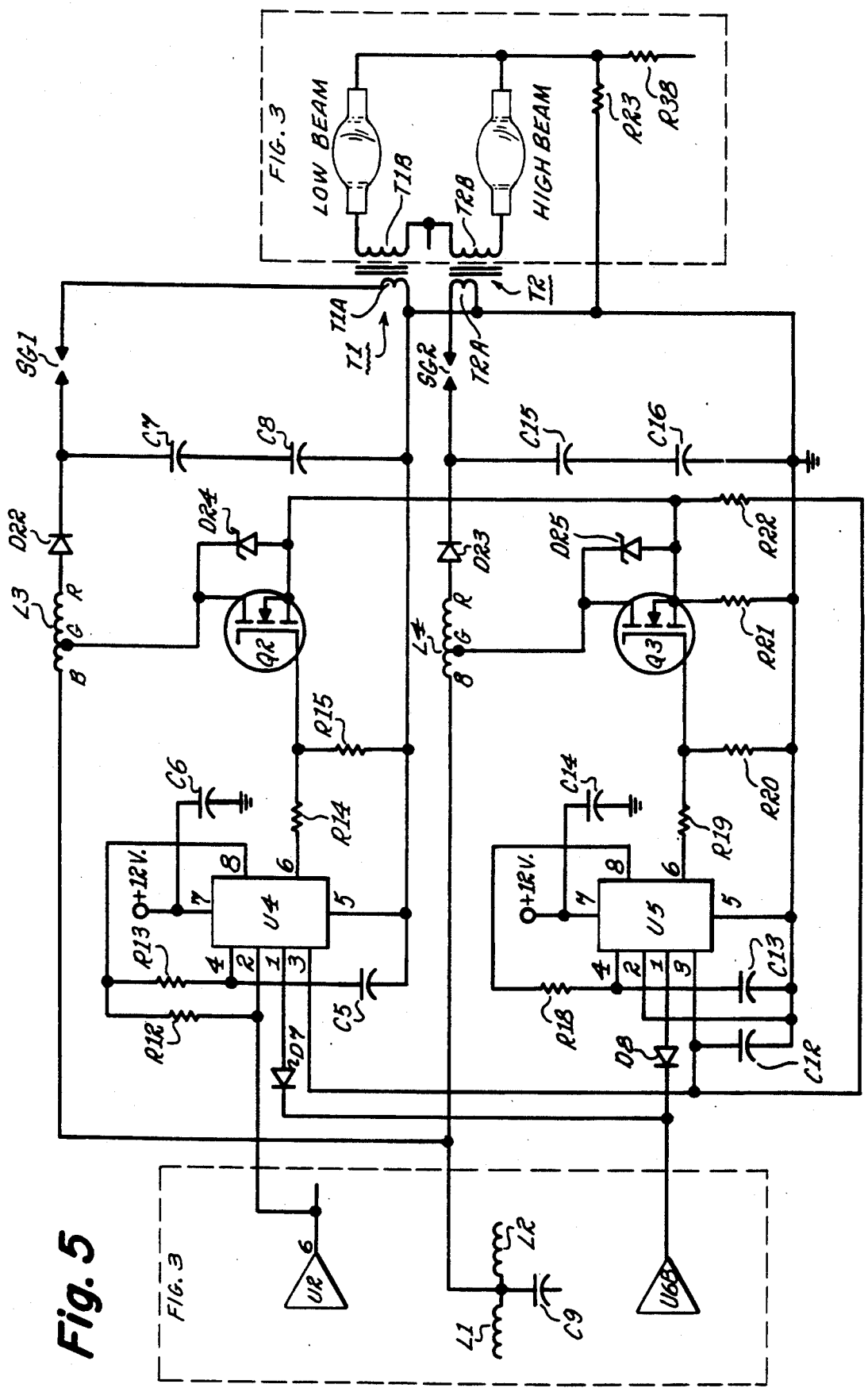
FIG. 5 is a schematic circuit diagram of the high beam and low beam starter circuits of the invention.

Preferred control and ballast circuits embodying the invention are shown schematically in FIGS. 3, 4 and 5. They will operate high and low beam headlamps on unidirectional current having imposed thereon frequency-modulated high frequency ripple as previously set forth.

For the convenience of those wishing to study our invention, appended TABLE 1 lists the principal circuit components by the same designation as in the drawings, along with a brief description and the source or vendor where appropriate.

The overall ballast comprises three separate DC-to-DC converters, a single one to run both lamps, and one each for starting the high and the low beam lamp. All are of the known boost converter configuration so that only departures essential to the invention need be discussed in detail. The use of separate starters eliminates the need for high voltage switching while enabling the use of a single run converter for both headlamps. The start converter delivers a 20 kilovolt pulse superimposed on the output of the run converter. The run converter is active at all times following the application of battery power at either the "HIGH" or "LOW" input terminals. Application of power to either of these terminals also activates the associated starter by means of relay K1, its contact K1C, and inductor L1. As explained later herein, the associated starter is shut down as soon as lamp current is established.

Referring to FIG. 3, the run converter is a tapped inductor boost converter comprising power switching transistor Q1, inductor L2, diode D21, capacitors C9 and C10, and a pulse width modulator (PWM) controller U7. The run current, controlled primarily by Q1 which has its bias controlled by PWM controller U7, is supplied to the lamps (high and low beam) through the path formed by D21, and transformer windings T1B and T2B. The inductance of these windings is small enough to allow rapid current build-up in the lamps but large enough to couple effectively the start pulse into the lamps: we have found inductance in the range of 30 to 100 microhenries suitable. The selection of a relatively small output capacitor C10 for the run circuit results in imposing a high output ripple on the run current.

The run converter is controlled in part by lamp current sampled by shunt resistor R23 and fed back to the PWM controller U7 (pin 2) after being smoothed by the low pass filter R38, R39 and C25. The average current applied to the lamp is controlled in a closed high gain loop. The reference for this loop is modified by the lamp voltage such that lamp current decreases linearly with increasing lamp voltage provided lamp voltage remains within a predefined operating band or window. In this manner lamp power (voltage times current) remains substantially constant with normal lamp voltage variations, as well as with normal input voltage (battery) variations. If lamp voltage is outside the window, the reference for the high gain loop changes to produce a constant lamp current. Normally the reference remains constant except for a predefined warm-up time to be described.

Referring to FIG. 4, the circuit that determines the window comprises a pair of precision voltage clamps consisting of diodes D13 and D14, and the associated operational amplifiers U8A and U8B, both part of the quad amplifier U8. Voltage across either high or low beam lamp applied to the top of the series resistor string R40, R41, R42 and R43 via R23 and C11, results in a current through the string which is part of the high gain control loop reference supplied to PWM controller U7 (pin 2) in FIG. 3. This current is proportional to lamp voltage provided neither of the two precision clamps is active. The clamps are designed to activate at the upper and lower lamp operating voltage limits, for instance at 40 and at 50 volts. When lamp voltage is outside the limits established by the clamps, the reference is independent of lamp voltage and the lamp current is as a result held constant provided the warm-up timer has timed out.

The function of the warm-up timers is to supply much higher than normal power to warm up the lamp quickly, and then taper off to the run power desired for sustained operation. There are two similar warm-up timers, one comprising transistors Q5 and Q6 and op-amp U8C for the high beam lamp, and the other comprising transistors Q7 and Q8 and op-amp U8D for the low beam lamp. The timers include an important memory feature. When power in the form of the run signal is removed and reapplied to either of the lamps, the timer remembers how long its associated light source was off and adjusts the subsequent warm-up time accordingly. In the absence of this feature, if an unvarying warm-up program of power control were provided, frequent short turn-ons and turn-offs of the headlamps could result in overheating and damage to them.

Since the two warm-up timers are similar and operate similarly, only the operation of the high beam timer will be described. Referring to FIG. 4, the application of battery voltage to the "HIGH" input terminal (in the FIG. 3 inset) turns on and saturates transistors Q5 and Q6. Timing capacitor C27 charges through R50 and Q5 from the regulated +5 volt source connected to Q5. The capacitor's voltage is buffered by op-amp U8C and appears at the top end of resistor R56. The current in R56 is part of the control loop reference. The reference therefore changes to produce a decreasing lamp current until the timing capacitor is fully charged.

The timer design imparts a certain desirable dwell at the beginning of the time cycle of the current supplied to the lamp, and lamp power is held at maximum during this dwell time. The dwell is caused by the initial voltage at the inverting input of op-amp U8C. This initial voltage holds the op-amp in saturation and its output low until timing capacitor C27 has charged up to match the initial voltage. When power is removed, the timing capacitor discharges through R50 and R51. If power to the lamp is reapplied before the capacitor is completely discharged, the capacitor will recharge in less time, and the circuit will time-out sooner than it would have if the capacitor had been allowed to discharge fully. The time during which high power is imposed on the lamp by the circuit depends on the length of time that power has been off. Shorter off-times result in shorter intervals of high power. The timer circuit design includes these features so that circuit time constants are roughly matched to the thermal time constants of the lamp. The result is substantially constant light from the moment the switch is thrown.

There are two starters, one for the high beam lamp and one for the low beam lamp. Referring to FIG. 5, the high beam starter includes integrated circuit U5, transistor Q3, tapped inductor L4, diode D23, capacitors C15 and C16, and transformer T2 plus associated bias components. The low beam starter has identical components arranged around integrated circuit U4. The operation of only the high beam starter will be described. The starter is an independent boost converter operating with current feedback only. Assuming the starter is enabled, inductor L4 injects pulses of current into capacitors C15 and C16. The capacitors accumulate charge until their voltage rises to the breakdown potential of the spark gap SG2. A spark across the gap discharges the capacitors through the primary T2A of transformer T2, generating a high voltage pulse in the secondary T2B which is applied across the lamp. The low beam starter operates in the same way with spark discharges across gap SG1 and pulses generated in T1B. This circuit action continues until the starter is automatically disabled after the lamp has started, as will be described below.

Comparator U6B in FIG. 3 provides the enable/disable input to the starters in FIG. 5. It senses the average lamp voltage via its +ve input side. When this voltage falls below a certain value, for example below 184v, the starter for the high beam lamp is disabled via diode path D8 into integrated circuit U5, or that for the low beam lamp is disabled via diode path D7 into integrated circuit U4.

Comparator U6C in FIG. 3 provides a voltage limit function for the run converter. This comparator monitors the output voltage of the run converter via its +ve input side and R29, and when the voltage exceeds a certain value, for example 200 volts, it outputs an inhibit signal to the run converter via pin 3 of integrated circuit U7.

Comparator U6D provides an anti drop-out feature. This comparator senses changes in the lamp voltage. In the event of a sudden rise in lamp voltage, the comparator puts out a signal to U7 via pin 2, which signal is applied in turn to pin 1 of U7 via R36 and C21 so as to increase the lamp current for a short time. A sudden increase in lamp voltage may be due to mechanical shock and could extinguish the lamp, but this design feature keeps the lamp lit.

Comparator U6A provides for automatic shut-down of the ballast circuit in the event of a failed lamp. Timing components C17 and R24 determine the maximum time, for example ½ second, that either starter is allowed in which to succeed in starting its associated lamp. Thereafter, if no start, shutdown of the ballast occurs. The starters are inactivated via the path formed by D10, R24, in FIG. 3 and D7 and D8 in FIG. 5. The run circuit is inactivated via the path formed by D11 leading to pin 3 of U7 in FIG. 3. This feature prevents radio interfernce by continuous attempted starting of a failed lamp.

Timer IC U3 in FIG. 3 provides foa a flash-to-pass feature. This integrated circuit is configured as a free-running oscillator with a period of 0.5 second. When both HIGH and LOW inputs are present together at the input stage of U2, the oscillator is enabled. The oscillator causes the lamp current to pulse to a higher value every half second via path D6, C20, U6D, R36, C21 and pin 1 of U7.

A minimum off-time feature is provided by integrated circuit U1A (a timer configured as a one-shot). Anytime power, via terminals HIGH, LOW of FIG. 3 is removed and then quickly reapplied, U1A holds off for 20 milliseconds the operation of the run converter via the path formed by D3, R5 and pin 3 of U7. Absent this feature, a rapid switch between high and low beam lamps could result in the original lamp remaining on.

Integrated circuit U1B in FIG. 3 is configured as an astable multivibrator and provides for frequency modulation of the lamp current. The sawtooth output from this circuit, represented by signal 18 in FIG. 3, feeds into the frequency determining input (pin 4) of the run converter's PWM controller U7 via the path formed by R4 and C3. The modulation frequency, which is the output frequency from U1B, is about 500 Hz.

For the ballast circuit embodiments shown in FIGS. 3, 4 and 5, the unidirectional run current has a ripple at a frequency of about 100 kHz imposed on it with an amplitude of about 50%, and the ripple frequency is frequency-modulated at about 500 Hz. These quantities may be varied by (1) reducing the value of C10 to increase the ripple frequency, (2) reducing the value of C9 to increase the amplitude of the ripple, and (3) adjusting U1B to vary the frequency modulation of the ripple modulation.

COMPACT HEADLAMP ASSEMBLIES

Figure 6:
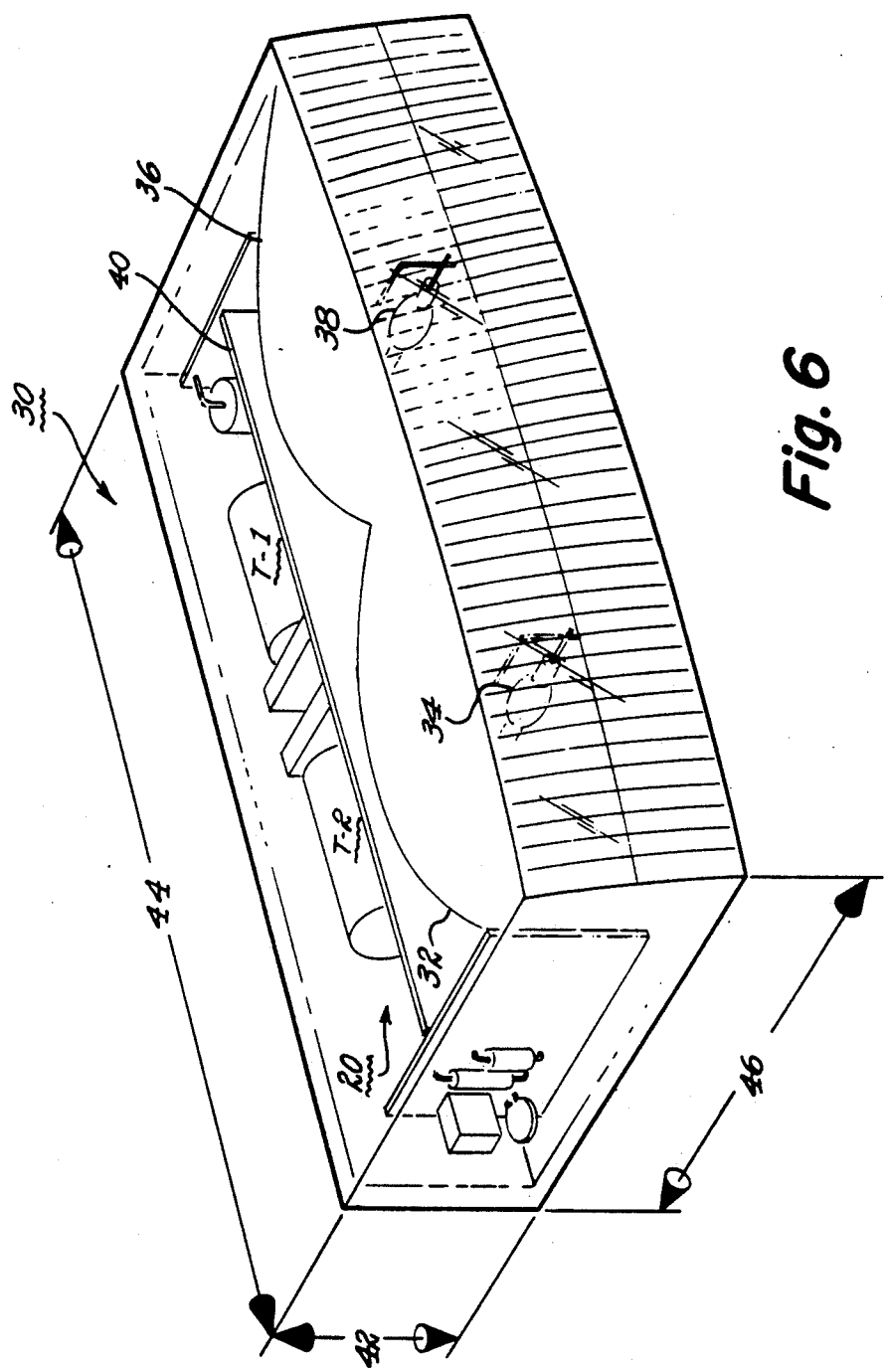
FIG. 6 illustrates pictorially a high/low beam discharge headlamp assembly including all circuitry per the invention.

Referring to FIG. 6, a unidirectional acoustic ballast and dual headlamp assembly 30 embodying the invention is illustrated. It comprises a first reflector 32 and lamp 34 for the high beam, and a second reflector 36 and lamp 38 for the low beam. The ballast components previously described in connection with FIGS. 3, 4 and 5 are indicated at 20 and are mounted to the rear of the reflectors on a circuit board 40 in the space behind the headlamps. The pulse transformers T2 and T1 for starting high and low beam lamps 34 and 38 may be seen.

Figure 7B:
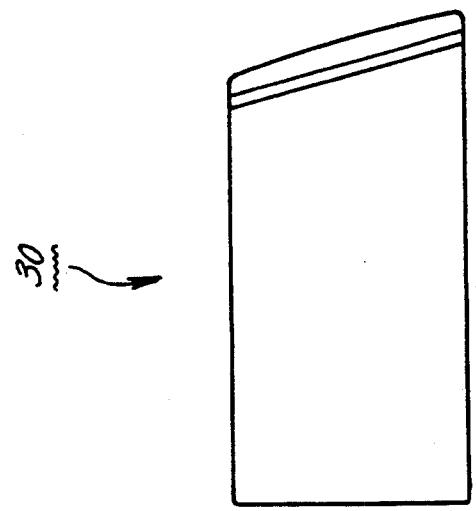
FIGS. 7a and 7b provide a side view size comparison of a conventional high/low beam headlamp assembly with one embodying the invention.
Figure 7A:
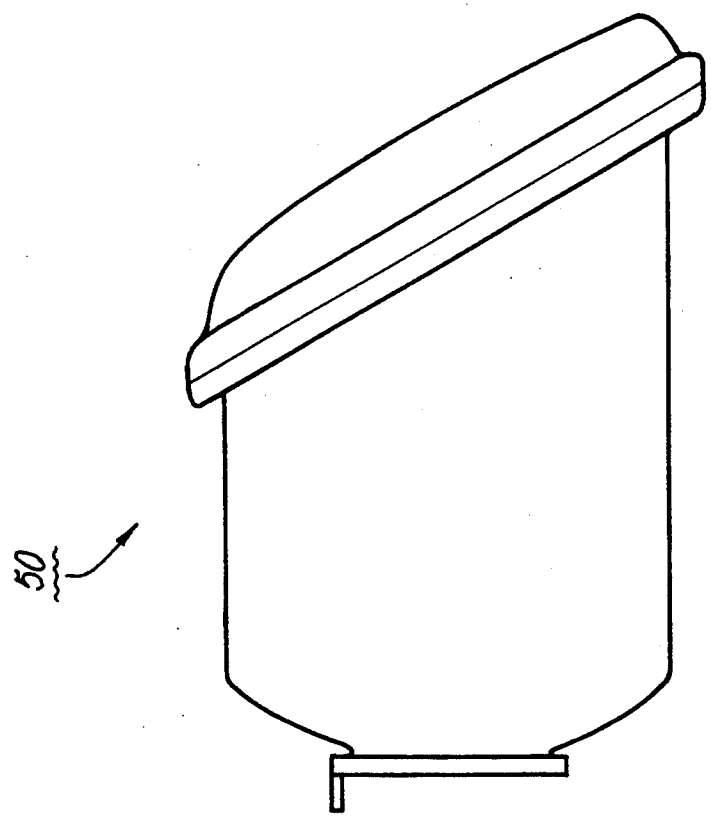
Figure 8B:
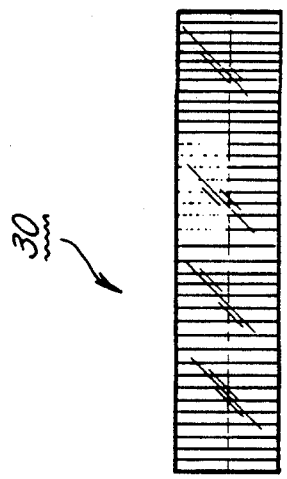
FIGS. 8a and 8b provide a similar comparison of face or lens end views for the same assemblies.
Figure 8A:
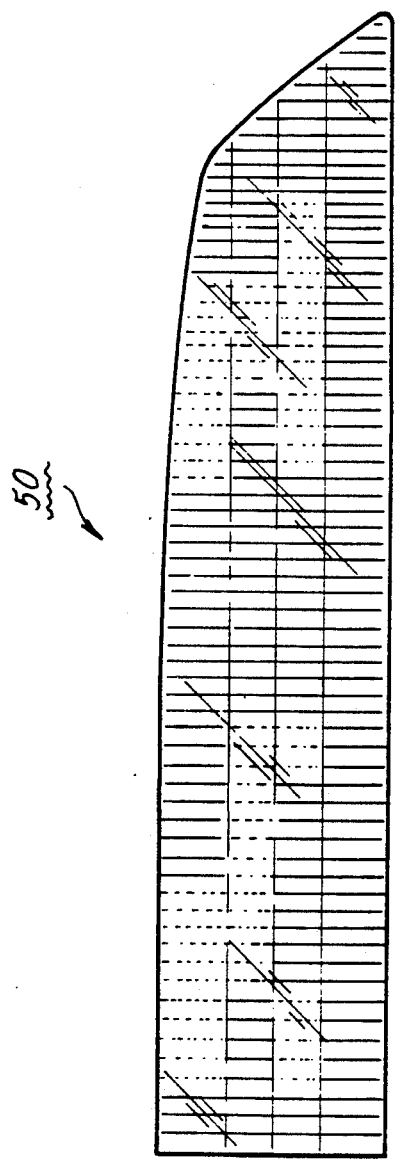

The particular integrated dual headlamp assembly 30 illustrated in FIG. 6 by way of example has a height 42 of about 50 mm, a width 44 of about 250 mm, and a depth 46 of about 100 mm. This represents a tremendous reduction in size relative to conventional headlamps as may be appreciated by the contrast between assembly 30 shown in side view in FIG. 7b and the conventional incandescent dual headlamp 50 shown in FIG. 7a. The contrast is again seen between FIG. 8b showing assembly 30 in front or lens end view, and FIG. 8a showing a corresponding view of conventional headlamp 50. The present invention has permitted an overall volume reduction of about 75% in respect of conventional halogen headlamps.

MAGNETIC FIELD SUPPLEMENTATION

It has been known since the early days of the dynamo and the carbon arc lamp that a magnetic field could be used to displace an electric arc from its normal position, or to reduce its bowing to straighten it.

We have discovered that our use of DC, or more exactly of unidirectional current, to which we add a high frequency AC component by ripple modulation for acoustic straightening of the arc, lends itself readily to additional arc control by a magnetic field. By the combination and cooperation of acoustic with magnetic means, we have achieved unexpected effectiveness in controlling the arc.

Figure 9:
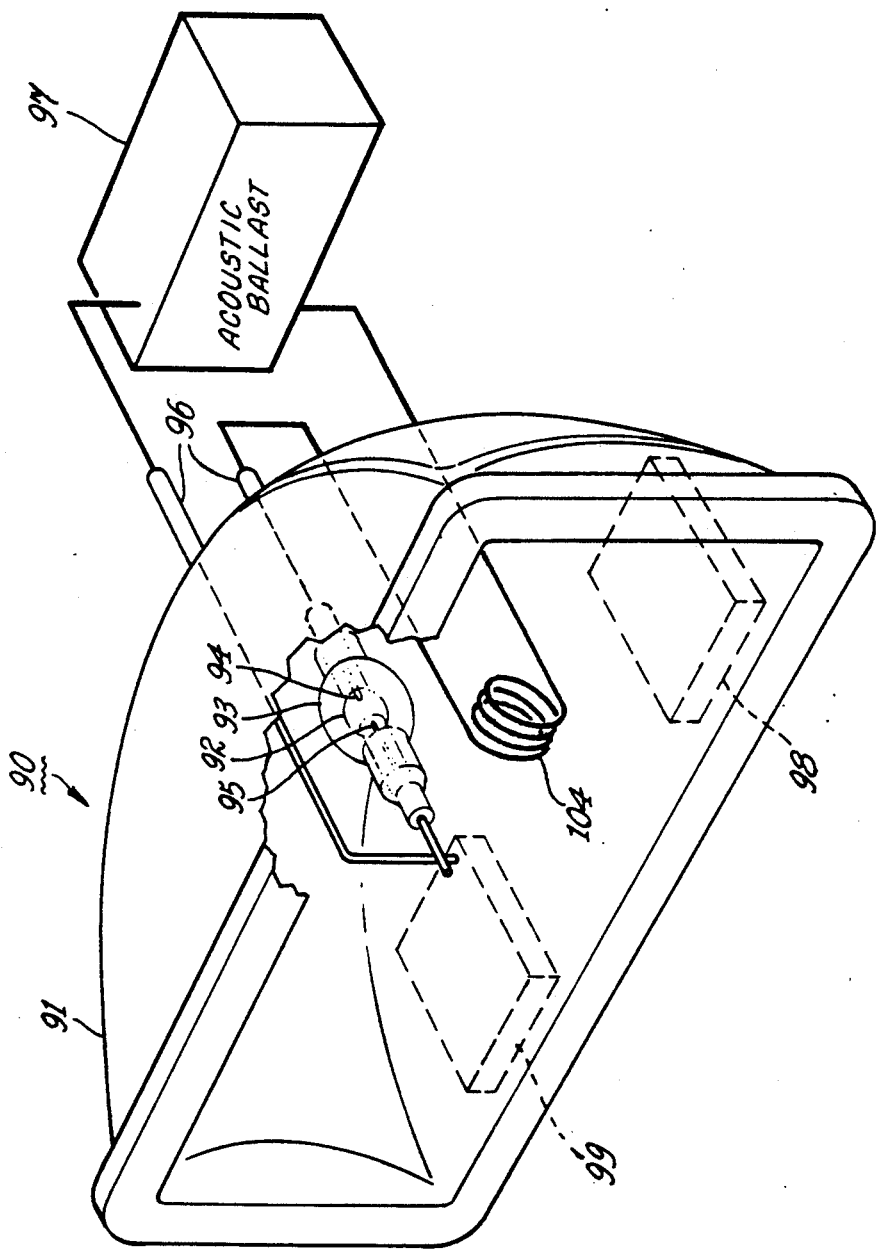
FIG. 9 is a pictorial partly cut-away view of a single beam discharge headlamp embodying the invention and using permanent magnets for arc shifting.

Miniature xenon-metal halide lamps for automotive headlamp applications may be single-walled as shown for instance in FIG. 6 herein at 34 and 38, or shrouded, that is double-walled, as shown in headlamp 90 in FIG. 9. The shroud is beneficial in maintaining a more even temperature and more uniform distribution of metal halide in the inner bulb. With both kinds of lamps, but more so with the shrouded ones, when operated about 30 watts input, bowing of the arc and its proximity to the upper wall may soften the quartz, causing it to bulge and eventually fail. It is desired to find a means of decreasing the upper wall temperature in order to avoid bulging and short life. If possible the lower wall temperature should be raised in order to increase the vapor pressure of the metal halides and thereby increase the efficiency.

Earlier mentioned application Ser. No. 157,436 by Rolf S. Bergman, and U.S. Pat. No. 4,935,668 Richard L. Hansler et al, disclose, respectively, plain and shrouded xenon-metal halide lamps arc tubes suitable for use in this invention.

We have found that a constant magnetic field such as produced by permanent magnets, or by coils carrying a direct current, can be used as a supplement to acoustic resonance straightening of the arc. It can be used to force the arc down so as to reduce the temperature of the upper wall and increase that of the lower wall. Alternatively it can be used to lengthen the arc gap that acoustic straightening can straighten. The most pronounced effect appears to be on the sodium plume which normally is found primarily above the core. When a constant magnetic field is applied, the sodium emission becomes near-symmetric about the core. A field of 10 to 15 gauss is all that is required with the arc tube operated on DC with 100 kHz ripple at a modulation depth of about 60%. This results in a drop of 100 to 180 degrees centigrade in the maximum temperature of the upper wall.

Referring to FIG. 9, automotive headlamp 90 comprises a reflector 91 made of a suitable plastic, whose front is normally closed by a clear faceted lens not shown here. The light source is a xenon-metal halide arc tube comprising an inner vitreous silica envelope 92 and an outer envelope or shroud 93 surrounding it. As shown the tube is horizontally mounted on a fore and aft axis with the larger anode 94 to the rear and the smaller cathode 95 to the front. It is supported within the headlamp by inleads which extend out the back of the reflector through feed-through terminals 96 for connection to a ballast 97, preferably an acoustic one per the present invention.

In accordance with the invention, magnetic means 98, 99 are positioned relative to the arc tube to produce at the arc a horizontal transverse magnetic field, suitably in the range of 5 to 15 gauss. We have found that small ferrite magnets about 1 by ⅜ by ¼ inch in size and transversely magnetized are suitable. They may be cemented to the plastic reflector, preferably to the underside of the bottom where they are less subject to heat from the lamp. In one such arrangement, one of the magnets 98, 99 is N-pole up and the other is S-pole up; they are spaced apart about 1¾ inch and are located about 1 inch below the arc tube.

Figure 10:
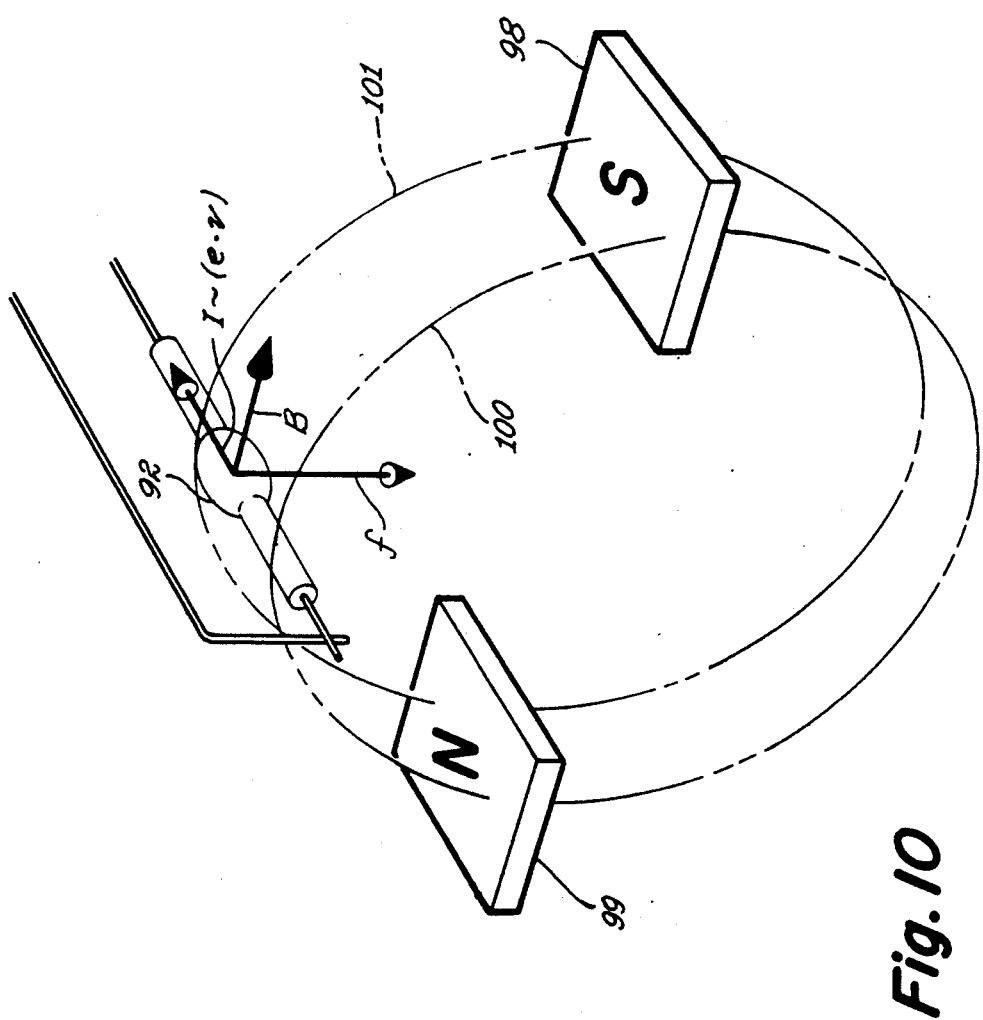
FIG. 10 is pictorial schematic showing the spatial relationship of arc tube, current flow, and magnetic lines.

The spatial interrelationship of current flow through the arc tube along its axis, the magnetic lines of force and the resulting force on the arc are illustrated in FIG. 10. The representative magnetic lines 100, 101 of the field produced by the flat magnets 98, 99 are horizontal and transverse at the arc and may be represented by vector B. The force on both the electrons and the ions which are moving in the discharge is the result of the vector product of their velocity and the magnetic field, and in which the signs are opposite due to the signs of the charges. Since both the charges and the directions are opposite, the force is in the same direction as regards both electrons and ions. The current I is axial and vector B is transverse, so the resulting force f on the charged particles is orthogonal to both and therefore down as shown. Since the sodium is highly ionized compared to the mercury and scandium, and since the sodium is comparatively light, it experiences the greatest effect.

The downward force f adds to the acoustic straightening effect and may supplement it to force the arc down and away from the upper wall of the arc tube. It is immaterial how the desired magnetic field is created, whether by permanent magnets or by coils carrying direct current, so long as it has the desired direction and intensity at the arc.

Figure 11A:
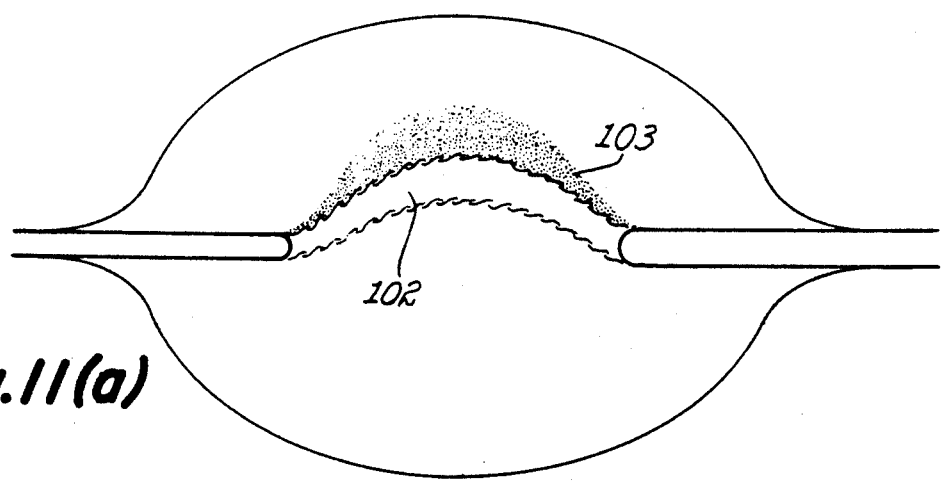
FIGS. 11a, 11b and 11c illustrate typical location and shape of the arc core and sodium plume in an arc tube without any arc straightening, with acoustic straightening only, and with both acoustic and magnetic straightening.
Figure 11B:
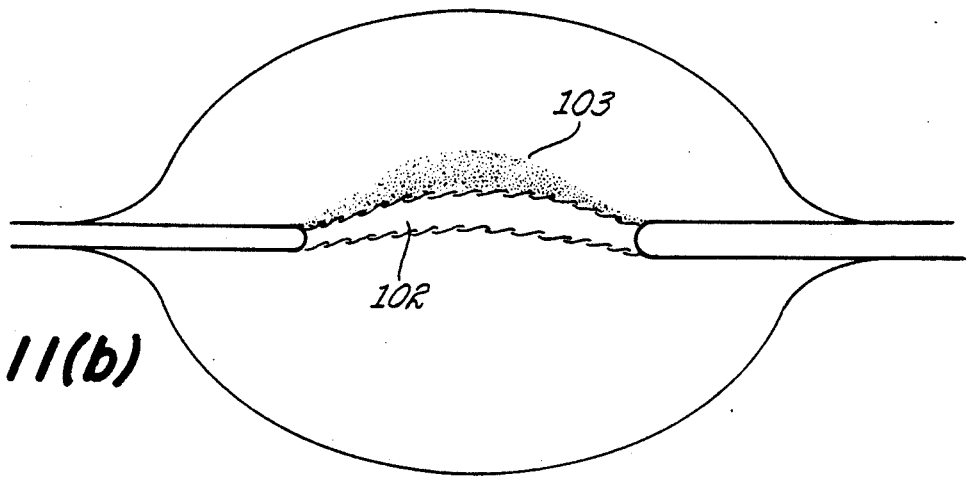
Figure 11C:
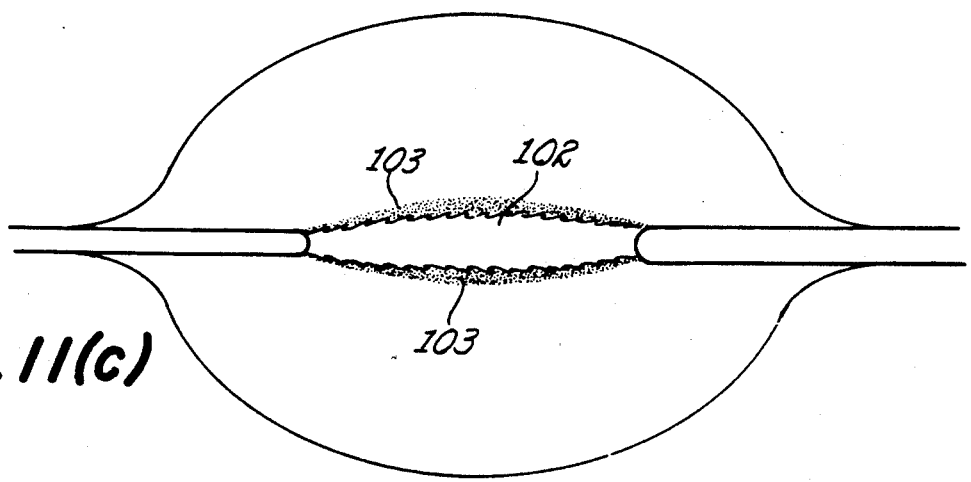

Some of the benefits of magnetic field supplementation may be seen in FIGS. 11a, b and c, all of which represent in simplified form the interior of inner arc tube 92 and the discharge between anode 94 and cathode 95. The discharge comprises a white core portion 102 and a pinkish sodium plume portion 103. In FIG. 11a, operation is without any kind of stabilization: the core of the arc bows up and the sodium plume floats above it. In FIG. 11b, only acoustic straightening is provided: the core is almost straightened but the sodium plume is still above it. In FIG. 11c, both acoustic straightening and magnetic displacement are used: the core 102 is now fully straightened and the sodium plume 103 is symmetrical above and below the core.

In tests of an arc tube 92 (unshrouded) which had a high temperature of 1140° C. at its upper wall above the anode when operated by acoustic ballast 97, the temperature was observed to drop to 960° C. when two magnets were positioned at the lower side of the reflector as shown in FIG. 9. The lamps tested typically had an interelectrode gap of 2.5 mm.

In further tests, lamps with an interelectrode gap of 4.0 mm were used. This length is favored because it corresponds to that of the tungsten filament which has been used in auto headlamps and allows the use of conventional optics in reflector and lens. When the lamps were operated on the acoustic ballast, the arc ran close to the upper wall. A suitable magnetic field was then provided, and this caused the arc to be pulled into the center of the lamp where it operated very stably. In this condition, the light source was turned off and then on again. After a momentary hesitation during the presence of the large start current previously discussed, during which the arc was close to the lower wall, the arc snapped into the center with the sodium plume 103 symmetrical about the core as shown in FIG. 11c.

With regard to the initial momentary operation of the arc close to the lower wall of the 4.0 mm arc gap lamp, this occurrence does not appear to damage the lamp. However if this initial condition is objectionable, it may be avoided by the use of the coil 104 in FIG. 9. The coil is located within the reflector under the arc tube where its presence does not interfere with the light going to the parabolic walls. It is connected in series with the lamp to receive the same unidirectional ripple-modulated current generated by ballast 97. The arc current through the coil develops a magnetic field at the arc which opposes that of the magnets 98 and 99. During the high start current provided to warm-up the lamp, the coil's field neutralizes the permanent field so the arc is not driven down against the lower wall. Then during normal run operation the current is much lower and the permanent field prevails. The effect of the coil field during run is counterbalanced by choosing slightly stronger permanent magnets 98 and 99 for the permanent field.

The foregoing examples of operating conditions in the practice of the method of the invention, of specific ballast circuits, of arc tubes and headlamp assemblies and magnetic arrangements are intended as illustrative and the scope of the invention is to be determined by the appended claims.

TABLE 1

| RESISTORS | |
|---|---|
| R1 | 4.7k |
| R2 | 200k |
| R3 | 22k |
| R4 | 68k |
| R5 | 10k |
| R6 | 10k |
| R7 | 470k |
| R8 | 47k |
| R9 | 47k |
| R10 | 1m |
| R11 | 10k |
| R12 | 10k |
| R13 | 12k |
| R14 | 10 |
| R15 | 10k |
| R16 | 10k |
| R17 | 120 2w |
| R18 | 12k |
| R19 | 10 |
| R20 | 10k |
| R21 | .13k 2w |
| R22 | 1k |
| R23 | .5 2w |
| R24 | 100k |
| R25 | 22k |
| R26 | 10k |
| R27 | 5.1k |
| R28 | 200k |
| R29 | 200k |
| R30 | 5.6k |
| R31 | 1m |
| R32 | 47k |
| R33 | 10k |
| R34 | 1k |
| R35 | 1.8k |
| R36 | 1k |
| R37 | 10 |
| R38 | 470 |
| R39 | 470 |
| R40 | 50k |
| R41 | 50k |
| R42 | 1k |
| R43 | 6.8k |
| R44 | 1.8k |
| R45 | 1.8k |

TABLE 1-continued

| | |
|---|---|
| R46 | 47k |
| R48 | 2.7k |
| R49 | 47k |
| R50 | 270k |
| R51 | 4.7m |
| R52 | 270k |
| R53 | 4.7m |
| R54 | 47k |
| R55 | 47k |

Note: All resistors are given in ohms and are ¼ watt unless otherwise specified.

CAPACITORS

| | |
|---|---|
| C1 | .1 100v |
| C2 | .1 100v |
| C3 | .1 100v |
| C4 | .47 100v |
| C5 | .0082 100v |
| C6 | .1 100v |
| C7 | .0068 2kv |
| C8 | .0068 2kv |
| C9 | 470 35v |
| C10 | .1 200v |
| C11 | 10 180v |
| C12 | 150pF 100v |
| C13 | .0082 100v |
| C14 | .1 100v |
| C15 | .0068 2kv |
| C16 | .0068 |
| C17 | 4.7 25v |
| C18 | 100 25v |
| C19 | .01 100v |
| C20 | 10 25v |
| C21 | .47 100v |
| C22 | .001 100v |
| C23 | .1 100v |
| C24 | .1 100v |
| C25 | .47 25v |
| C26 | 4.7 25v |
| C27 | 4.7 25v |
| C28 | .01 100v |
| C29 | 4.7 25v |
| C30 | .01 100v |

Note: All capacitors are given in microfarads unless otherwise specified. (pF = picofarad)

POTENTIOMETERS

| | |
|---|---|
| P1 | 20k ½w |
| P2 | 10k ½w |
| P3 | 10k ½w |

DIODES

| | |
|---|---|
| D1 through D17: | IN4148A |
| D18 | HER 805 |
| D19 | HER 805 |
| D20 | HER 805 |
| D21 | HER 805 |
| D22 | 20v Diode |
| D23 | 20v Diode |
| D24 | 150v 5w Zener |
| D25 | 150v 5w Zener |
| D26 | 150v ½w Zener |

INTEGRATED CIRCUITS

| | |
|---|---|
| U1 | 556 Signetics |
| U2 | TL331 Texas Instruments |
| U3 | 555 Signetics |
| U4 | UC3843 Unitrode |
| U5 | UC3843 Unitrode |
| U6 | LM339 National |
| U7 | UC3843 Unitrode |
| U8 | LM324 National |
| U9 | MC78L08ACZ Motorola |

TRANSISTORS

| | |
|---|---|
| Q1 | IRF 640 |
| Q2 | IRF 630 |
| Q3 | IRF 630 |
| Q4 | 2N2222 |
| Q5 | 2N2222 |
| Q6 | 2N2222 |
| Q7 | 2N2222 |
| Q8 | 2N2222 |

INDUCTORS

TABLE 1-continued

| | |
|---|---|
| L1 | 50 |
| L2 | 50, 25% Tap |
| L3 | 50 |
| L4 | 50 |

Note: L1, L3 and L4 are given in microhenries, whereas L2 is given in millihenries.

What we claim as new and desire to secure by Letters Patent of the United States is:

1. A method of operating a miniature high pressure metal vapor discharge lamp of a kind comprising:

a vitreous envelope defining a discharge space having a volume not exceeding approximately 1 cubic centimeter, a cathode and an anode sealed into the envelope and defining an arc gap, and a fill comprising mercury, metal halides and a radiation-emitting gas in a quantity exerting a partial pressure of at least 25% of the total vapor pressure during continuous operation, which method comprises:

forcing a unidirectional current having an alternating component in the form of a high frequency ripple imposed thereon causing instantaneous variations in input power across the arc gap, said variations in power being at a frequency selected in a preferred band within the range from 20 kHz to 200 kHz, said band being one in which acoustic resonance excites arc-straightening modes which reduce the effects of gravity-induced convection in the fill.

2. The method of claim 1 wherein said preferred band is one in which acoustic resonance excites a mode effective to reduce gravity-induced bowing of the arc, lower the hot spot temperature, raise the cold spot temperature, and reduce cataphoresis in the lamp.

3. The method of claim 1 wherein the alternating component of the current through the lamp at said selected frequency is frequency-modulated in order to broaden the width of the band of frequencies in which a straight and stable arc is obtained.

4. The method of claim 1 practiced on a lamp of said kind wherein the arc gap is horizontal, wherein xenon is included in the fill for the radiation-emitting gas, and wherein sodium is included as a halide;

and wherein said band is one in which acoustic resonance excites arc-straightening modes which also reduce cataphoresis and its effect on color separation.

5. The method of operating a miniature high pressure metal vapor discharge lamp of a kind comprising:

a vitreous envelope defining a discharge space having a volume not exceeding approximately 1 cubic centimeter, a cathode and an anode sealed into the envelope and defining a horizontal arc gap, and a fill comprising mercury, metal halide, and xenon gas in a quantity exerting a partial pressure of at least 25% of the total vapor pressure during continuous operation;

which method comprises:

initiating ionization across the gap by high voltage pulses, forcing a unidirectional current across the gap at a high level during a starting phase in order to warm up the lamp and reducing said current to a lower level during the run phase, and imposing a high frequency ripple on said current at a modulation depth which is a lower percentage during the starting phase than during the run phase.

6. The method of claim 5 wherein the current during the start phase is in the range of 2 to 20 times the run current, and wherein the ripple is roughly constant in absolute value throughout start and run phases and has a modulation depth of at least 30% during the run phase in order to assure a wide frequency band of stable operation.

7. In combination a miniature high pressure metal vapor discharge lamp of a kind comprising:
   a vitreous envelope defining a discharge space having a volume not exceeding approximately 1 cubic centimeter,
   a cathode and an anode sealed into the envelope and defining a horizontal arc gap,
   and a fill comprising mercury, metal halides including sodium, and xenon gas in a quantity exerting a partial pressure of at least 25% of the total vapor pressure during continuous operation;
   and a source of unidirectional current having a high frequency ripple imposed thereon for operating said lamp, said ripple providing modulation of power to the lamp in frequency bands in which acoustic resonance excites arc-straightening modes,
   and means providing a horizontal magnetic field at said gap transverse to current flow in order to supplement the acoustic modes in straightening and controlling the arc.

8. The combination of claim 7 wherein said lamp is mounted in a headlamp reflector assembly and the magnetic field is provided by permanent magnetic means fastened to the assembly.

9. The combination of claim 8 wherein the ripple-modulated unidirectional current supplied to the lamp is several times greater during a start phase for warming up the lamp than during the run phase of operation that follows it, and electomagnetic means for opposing the permanent magnetic field at said gap, said electromagnetic means being energized by the lamp current whereby to neutralize at least in part the permanent magnetic field and avoid driving the arc down against the lower wall of the lamp during the start phase.

10. The combination of claim 9 wherein the electromagnetic means is a wire coil located within the reflector assembly below the lamp and connected in series with it.

11. An integrated compact discharge headlamp and ballast assembly comprising:
   a vitreous arctube lamp having a volume less than 1 cubic centimeter, a cathode and an anode sealed therein defining an arc gap in the range of 2 to 5 mm, and a fill comprising xenon in a quantity exerting a partial pressure of at least 25% of the total vapor pressure in operation,
   a headlamp reflector within which said arctube is horizontally mounted on a fore and aft axis with the gap located near the focal point,
   starting means supplying high voltage pulses to ionize the gap and initiate current flow in the lamp,
   circuit means supplying unidirectional current to said lamp, said current having a high frequency ripple component imposed thereon for exciting arc-straightening acoustic resonance modes in said lamp,
   and timing and control means providing a higher current through said lamp during a start warm-up phase than during the run phase and increasing the modulation depth of the ripple as the current is decreased,
   said starting means, circuit means and timing and control means being combined and contained in a portion of the headlamp and ballast assembly.

12. An assembly as defined in claim 11 including means to frequency-modulate the high frequency ripple in order to broaden the frequency range of the arc-straightening modes.

13. An assembly as defined in claim 11 including means for creating a horizontal transverse magnetic field at said gap to supplement the acoustic straightening of the arc and reduce cataphoresis.

14. An assembly as defined in claim 11 including memory circuit means responsive to the time interval of lamp extinguishments of short duration, said memory circuit means reducing the duration of the high current starting phase according to said interval.

15. An assembly as defined in claim 11, doubled and made into a dual headlamp unit having high and low beams, two starting means being provided, one for each beam lamp, and a single circuit means being provided to supply current to either lamp.

* * * * *